Feb. 7, 1939.     F. MacCALLUM     2,146,377
DRY BATTERY
Filed Sept. 5, 1935     2 Sheets-Sheet 1
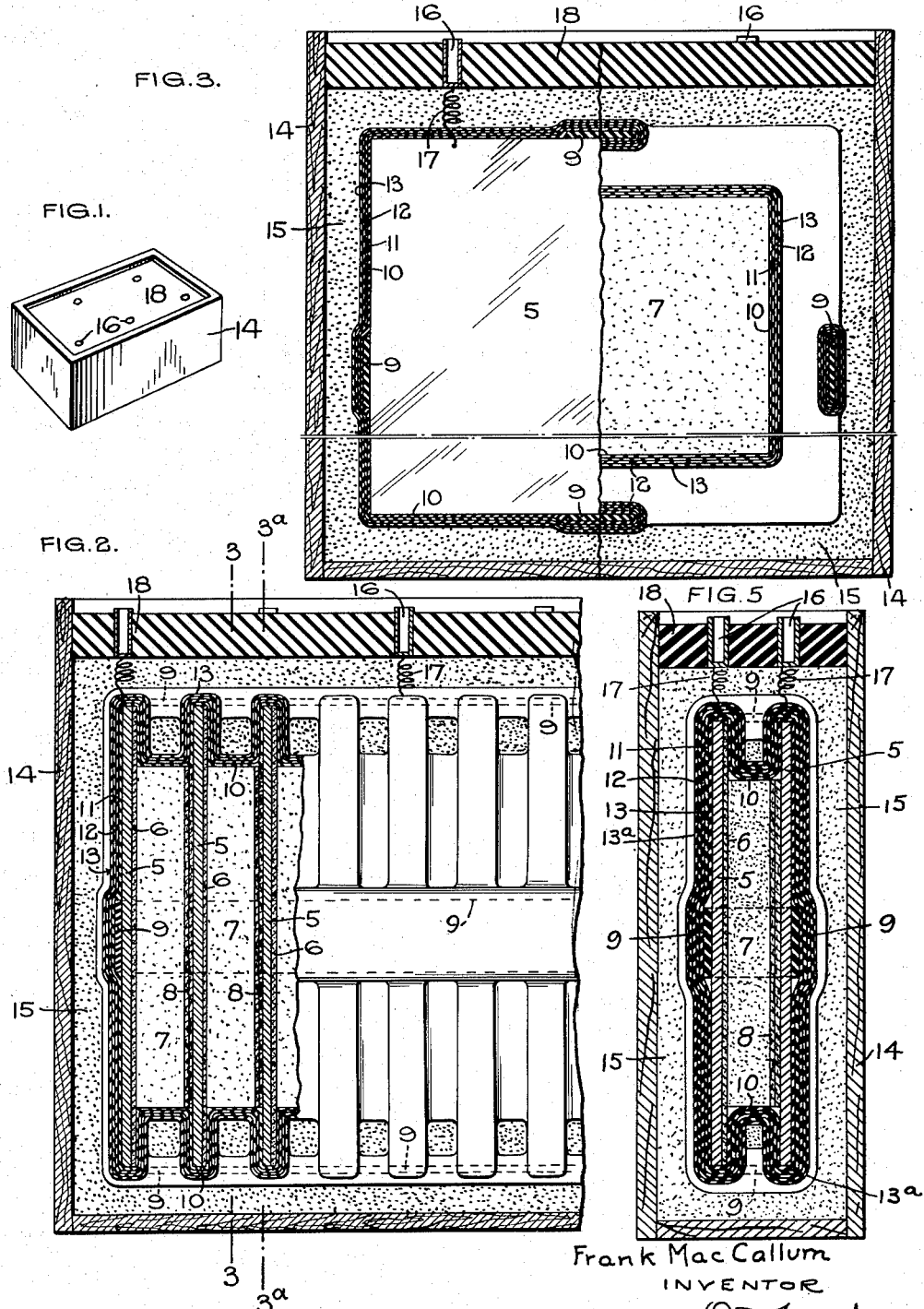
Frank MacCallum
INVENTOR
By Otto Kreunt
his ATTY.

Patented Feb. 7, 1939

2,146,377

UNITED STATES PATENT OFFICE

2,146,377
DRY BATTERY

Frank MacCallum, Birmingham, England, assignor of one-half to Alfred Henry Redfern, Birmingham, England, Helen Prince and Mary MacCallum, executrices of estate of Frank Mac-Callum, deceased Application September 5, 1935, Serial No. 39,249 In Great Britain April 28, 1933

17 Claims. (Cl. 136—111)

This invention relates to dry batteries including one or more cells comprising or each comprising a pair of electrodes arranged in spaced relationship with a depolarizer mix and an electrolyte, or a combined depolarizer mix and electrolyte in the space between said electrodes.

In one type of such batteries each cell includes a zinc or metal electrode in the form of a cylindrical cup and carbon electrode of stick or pencil form inserted in the cup along the axis thereof, the electrolyte and depolarizer being inserted in the cup around the stick or pencil, leaving sufficient space to permit expansion due to the evolution of gases or natural growth during the life of the battery.

Batteries of this kind are relatively expensive to assemble accurately and often fail eventually due to uneven electrolytic action caused by dimensional inaccuracies of the cell construction.

In an attempt to avoid the difficulties associated with the production of accurately assembled batteries of the cylindrical cup type, a further type has been proposed including electrodes of substantially flat sheet form, each cell comprising substantially flat zinc and carbon plates with a tablet of electrolyte and depolarizer mix arranged therebetween.

The construction of batteries in this manner is, however, accompanied by its own particular difficulties, one of which arises from expansion and contraction of the elements, whilst another arises from the expansion due to natural growth of the battery during its life.

It is necessary that the expansion should be permitted, but it is also essential to prevent free ingress and egress of air and gas, since this would dehydrate the electrolyte and the depolarizer and render the battery ineffective or even useless.

The primary object of the present invention is to provide a battery incorporating cell construction with positive and negative electrodes of substantially flat form and arranged sandwichwise with depolarizer mix and electrolyte between, and with means for enabling the expansion of the cell to accommodate natural growth and other chemical changes without the possibility of air entering and causing dehydration or drying of the elements of the cell.

It is thus essential that the means for permitting the expansion and contraction shall not interfere with the efficient sealing of the cell or allow the elements thereof to separate one from the other when such movements take place, sealing or protection against dehydration being particularly necessary with cells including flat electrodes for various reasons among them being the relatively large area of depolarizer exposed around the edges of the cell.

A further object of this invention is to provide a method of constructing dry batteries of generally improved construction.

Referring to the drawings:—

Figure 1 is a perspective view of a multicell battery constructed in accordance with this invention.

Figure 2 shows the same in longitudinal section.

Figure 3 is a transverse section of the same and on the left hand half is a section on line 3—3 of Figure 2 and on the right hand half on line 3a—3a of Figure 2.

Figure 5 is a section through a single cell battery according to the invention.

Figure 4:
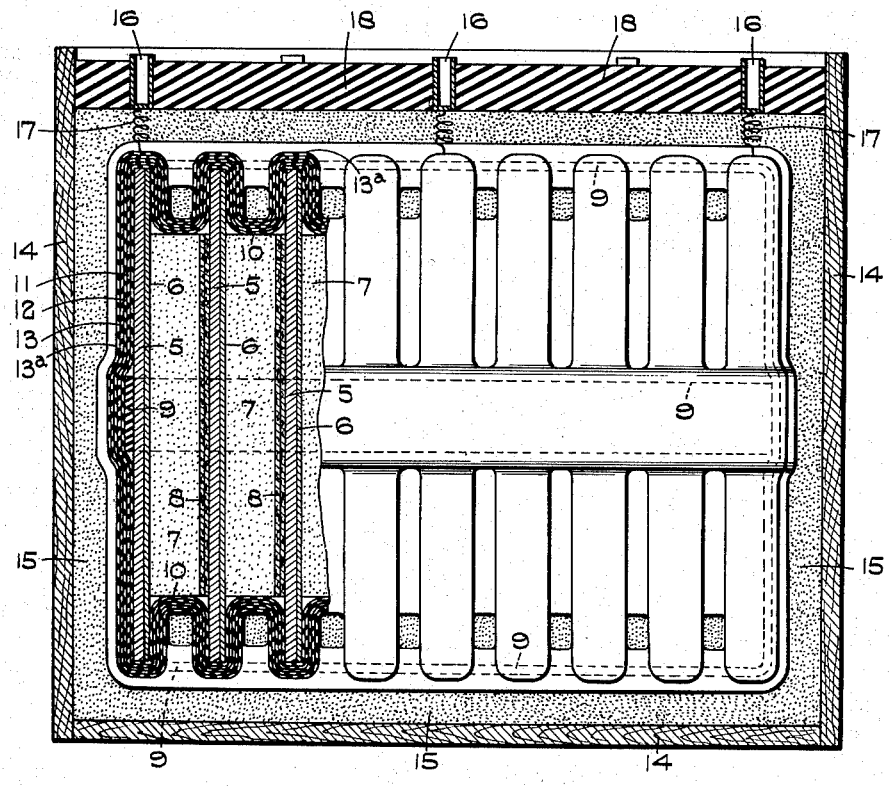
Figure 4 is a section through a slight modification.

In the construction illustrated in Figures 1 to 4 a battery is built up from a number of cells each consisting of a zinc electrode and a carbon electrode of substantially flat form arranged in spaced relationship with depolarizer and electrolyte therebetween.

The zinc electrodes comprise substantially flat plates 5 of zinc, and one side of each plate is provided with a coating 6 of carbon adapted to form the carbon electrode of one cell, while the zinc plate carrying this carbon coating forms the zinc electrode of the adjacent cell.

The carbon coating is preferably in the form of grains or particles of carbon or graphite secured by or bonded in an adhesive material which may have a rubber, bitumen, varnish or synthetic resin base.

Each element comprising a zinc plate with its carbon coating thus constitutes a duplex electrode and a suitable number of these electrodes are arranged in spaced relationship with the carbon coating 6 of one electrode facing the zinc face of the adjacent plate.

Between the electrodes are arranged tablets 7 of depolarizer and any suitable material or combination of materials may be used to form the depolarizer mix or the combined depolarizer mix and electrolyte from which the tablets 7 are formed.

The carbon electrode of each cell is placed in contact with one side of the depolarizer tablet with the zinc electrode at the other side and in contact between the tablet 7 and the zinc face a piece of porous paper 8 or similar material soaked and completely moist with a solution of ammonium chloride or other electrolyte is placed between the tablet 7 and the zinc face.

The composite battery is assembled by placing a tablet 7 upon the carbon coating of the end electrode, applying the moistened paper 8 and a further electrode with the zinc face towards the paper and repeating this process until the required number of cells has been assembled, a final zinc plate without a coating of carbon being arranged at the end of the assembly to form the negative electrode for the final cell.

If desired or convenient however, the battery may be assembled in the reverse order by placing first a zinc plate without a carbon coating, then electrolyte and paper 8, tablet 7 and duplex electrode with carbon coating downwards, repeating with electrolyte tablet 7 and duplex electrode until the assembly is completed.

The elements are applied one upon the other with a firm pressure sufficient to press each element into position as it is applied, and in this way all the elements are assembled in the desired association without danger of gaps or air spaces between one or more of the elements.

When the assembly is completed a binding 9 of flexible material is applied to maintain the elements in position, this binding preferably being capable of extension so as to permit natural expansion of the battery in use. The binding may be of rubber or elastic tape or cord applied under tension, or may be of woven material capable of extension.

The binding is placed around the assembly in two directions or planes at right angles to one another so that the several cells are firmly connected together.

To obtain complete isolation and insulation between each individual cell and at the same time to deal with the natural expansions already referred to, a coating 10 of quick drying varnish is then applied to the bound assembly either by a brushing, dipping or spraying operation, this varnish covering the whole of the assembly and sealing the exposed edges of the tablets 7 and/or interstices in the assembly.

This coating is required to be quick drying and when dry must be tough mechanically to provide sufficient strength to enable the assembly to be handled during the subsequent parts of the process, and it has been found that a suitable varnish can be formed from a gum or natural resin in a spirit solvent, such for example, as button shellac dissolved in methylated spirits.

A coating 11 of rubber or rubber compound is then applied either by a brushing, spraying or dipping operation over the assembly and the varnish coating 9, this rubber coating and also the varnish coating preferably being applied in a cold condition or without involving the use of any substantial heat.

The second coat may comprise rubber compounded in such a manner that it will adhere to the varnish coat and pure rubber may be dissolved in mineral naphtha to form the material for the second coat.

A further coating 12 of varnish is then applied over the rubber coating 11 and an outer coat 13 of rubber or rubber compound is subsequently applied to complete the enclosure of the elements of the assembly.

The coatings form an elastic skin which is impervious to liquid and to air or gas and this skin extends entirely around the assembly and over the binding 9 which latter is thus anchored at each cell by the elastic skin which joins the binding to the edges of the electrodes.

If desired or necessary, the coating process may be repeated by providing a varnish and rubber coat in succession, to form a laminated skin around the assembly of sufficient thickness to give strength for mechanical handling and also to prevent rupture under the natural expansion, but of sufficient resilience to permit the expansion to accommodate gas or natural growth of the cell without permitting any gas or moisture to pass from the cell, or air or moisture to penetrate into the cell.

The assembly with the laminated skin above described is put into a casing or container 14 of cardboard, wood or other suitable material and loose packing 15 of wood dust or other suitable material is inserted beneath and around the sides of the assembly with a thin layer on top of the assembly, which latter is thus completely surrounded by the loose packing.

The terminals permitting connections to be made to the various cells of the battery are in the form of metal sockets 16 adapted to receive plugs or pins and each socket is connected to the appropriate electrode by means of a short coil 17 of conducting wire, these connections, of course, being completed prior to assembly of the battery and during the construction of the zinc electrodes.

The coils 17 extend through the top layer of wood dust and the sockets lie substantially flush with the top of the casing 14 and project above the top layer of the packing.

Plastic sealing material such as pitch is then poured into the casing to form a top layer 18 which penetrates partly but not deeply into the top layer of packing and which encloses the sockets 16.

When the layer of sealing material 18 has hardened, the sockets 16 are embedded therein and due to the resilient connectors 17 and the loose packing provided around the assembly, the latter is permitted to move slightly and has a limited form of floating movement in the wood dust and suspended from the sockets 16 by the coils 17.

Thus limited movements of the assembly are permitted and expansion of the cells in use can take place without stressing the elements or cells such as would be the case if the assembly fitted tightly within the rigid casing.

In the slight modification illustrated in Figure 4, the battery is constructed as described above but a final coating 13a of varnish is provided over the coating 13 to give a dry handleable surface to the coated assembly.

Figure 5 shows a single cell battery according to the invention which is constructed similar to the multiple cell battery illustrated in Figure 4. The battery comprises a zinc electrode 5, a carbon electrode 6 disposed on a second zinc plate 5, the depolarizer mix 7, a paper sheet 8, soaked with electrolyte, and elastic binders 9. The different varnish and rubber coatings are denoted 10, 11, 12, 13, and 13a respectively. The battery is inserted in a casing 14 containing the loose packing material 15. Terminal sockets 16 are connected to the cell by means of springs 17 and the battery is sealed by a plastic top layer 18.

The initial varnish coating provided over the bound assembly insulates the cells and renders the assembly handleable and since the varnish coating dries rapidly there is little possibility of chemical interaction, such as might disadvantageously affect the elements of the cells.

The rubber coating takes a considerable time to dry or harden, and if this coating was applied directly to the assembly without first applying the coating of quick drying varnish, the general effect on the cell would be harmful for a number of reasons, as for instance (a) the absorption of the solvent from the rubber coating into the body of the cell affecting conductivity, and (b) disintegration of the internal varnish with attendant difficulties.

Such dangers are obviated by the use of the first varnish or similar coating.

The varnish coat is not substantially elastic, but whilst providing sufficient strength to hold the several elements together, is sufficiently thin to permit fracture thereof under the expanding stresses and in use this varnish skin cracks locally when expansion takes place.

The elastic coating adheres to the edge portions of the plates projecting beyond the edges of the depolariser tablet and thus prevents possibility of the electrolyte creeping from one cell to another in a manner which might short circuit one or more cells. Since there is no expansion causing relative movement between the coating and these portions of the plate the varnish coating on these edge portions does not crack and there is always a good seal between adjacent cells.

The surrounding rubber skin is, however, elastic and can stretch to accommodate the expansion and since the rubber coat adheres to the varnish coat, the latter is retained by the rubber and does not become detached from the assembly in the form of small pieces of varnish.

The laminated construction of the sealing skin provides adequate strength around the assembly, since the varnish coat or coats is or are tough, whilst the rubber adheres to the varnish and is elastic and resilient.

The binding 9 anchors the elements of each cell at four points spaced equally around the periphery thereof so that the two electrodes of each cell are resiliently located and retained in association independently of the elastic skin and by four spaced sections of the elastic binding.

Since the elastic skin encloses the binding and fixes it at the edges of each plate of the assembly, the several cells are each connected together by four sections of the binding, and the connection is independent of that for the adjacent cells.

Thus, in the event of abnormal expansion of one cell, only local stretching of the binding takes place and if the expansion should be such that the binding at one side is broken, the remaining cells are not affected, since the binding is anchored at each cell and fracture at one point does not permit the whole of the binding to unwind or become loosened.

The elastic skin together with the elastic or fabric band forms a mechanical bond, which in the case of a brakdown in any one cell, will retain the elements thereof in sufficiently close association to enable them to act as conductors, so that the circuit of the battery as a whole is not broken.

The cells are sealed independently of one another and the adherence of the skin to the projecting sides of adjacent plates may be stronger than the mechanical strength of the skin, and abnormal expansion in any one cell causes local bulging, or in extreme cases, local fracture of the skin, and part of the cell content can extrude through the fracture.

Such extruded material is however on the outside of the skin and is prevented, by the adherence of the skin to the assembly, from creeping to the adjacent cell or cells so that the fault is localised and cannot spread to other cells and cause breakdown thereof.

The elastic skin is sufficiently resilient to permit expansion due to natural growth of the battery or to accommodate any chemical changes producing expansion. The cell is thus protected against drying or dehydration of the elements, and since the assembly is entirely sealed by the skin of liquid and air impervious material, egress of gas or liquid is prevented so that the possibility of local action or creeping being set up is prevented and deterioration of the battery due to escape of the active products is effectively prevented.

The invention thus provides a dry battery or a method of constructing a dry battery which, during inactive life, is substantially inert and cannot be affected by any usual extraneous conditions of atmosphere so that the battery can be stocked for exceptionally long periods without substantial deterioration.

It will be understood that the varnish and rubber coatings need not be alternate as specifically described above and for example, two or more coats either of varnish or of rubber may be applied consecutively.

What I claim then is:—

1. In a flat type dry cell battery a depolarizer mix, a carbon electrode in contact with one side of said mix, an electrolyte and a zinc electrode at the other side of said mix, and a thin adhering skin of liquid-impervious material completely enclosing said mix and said electrodes, said skin being of substantially uniform thickness over the entire assembly of elements and having an external shape conforming to the external shape of the assembly and being of laminated construction including a thin coating of quick drying varnish adjacent said mix and said electrodes and a further coating of substantially uniform thickness extending entirely over said varnish coating, said further coating being of elastic material permitting expansion of the battery, said further coating being of elastic material and adhering firmly to said varnish coating.

2. In a flat type dry cell battery a depolarizer mix, a carbon electrode in contact with one side of said mix, an electrolyte and a zinc electrode at the other side of said mix, a binding of flexible material around said electrodes and mix, and a thin adhering skin of liquid-impervious material completely enclosing said mix and said electrodes and anchoring said elastic binding in position, said skin being of substantially uniform thickness over the entire assembly of elements and having an external shape conforming to the external shape of the assembly and being of laminated construction including a skin-like but mechanically strong coating of quick drying varnish adjacent said mix and said electrodes and a further coating of substantially uniform thickness extending entirely over said varnish coating, said further coating being of elastic material permitting expansion of the battery and adhering firmly to said varnish coating.

3. In a flat type dry cell battery a depolarizer mix, a carbon electrode in contact with one side of said mix, an electrolyte and a zinc electrode at the other side of said mix, a binding of flexible material around said electrodes and mix in two planes at right angles to one another, and a thin adhering skin of liquid-impervious material enclosing said mix and said electrodes and anchoring said elastic binding in position, said skin being of laminated construction including a coating of quick drying varnish adjacent said mix and said electrodes, a coating of rubber compound over said varnish coating, a further coating of varnish over said rubber coating and a further coating of rubber compound.

4. A battery assembly including a plurality of cells each including a depolarizer mix, a carbon electrode in contact with one side of said mix, an electrolyte and a zinc electrode at the other side of said mix, and a thin adhering skin of liquid-impervious material extending entirely over said assembly and enclosing the mix and electrodes of all said cells, said skin being of substantially uniform thickness over the entire assembly of elements and having an external shape conforming to the external shape of the assembly and being of laminated construction including a thin but mechanically strong coating of quick drying varnish adjacent said mix and said electrodes and a further coating of substantially uniform thickness extending entirely over said varnish coating, said further coating being of elastic rubber compound permitting expansion of the battery and adhering firmly to said varnish coating.

5. A battery assembly including a plurality of cells each including a depolarizer mix, a carbon electrode in contact with one side of said mix, an electrolyte and a zinc electrode at the other side of said mix, a binding of rubber tape applied under tension around said electrodes and mix in two planes at right angles to one another, and a thin adhering skin of liquid-impervious material enclosing the mix and electrodes of all of said cells, and anchoring said elastic binding in position, said skin being of laminated construction including a coating of quick drying varnish adjacent said mix and said electrodes, a coating of rubber compound over said varnish coating, a further coating of varnish over said rubber coating, a further coating of rubber compound, and a final coating of varnish to give a dry handleable surface.

6. In a flat type dry cell battery a depolarizer mix, a carbon electrode in contact with one side of said mix, a zinc electrode at the other side of said mix, a sheet of porous material between said zinc electrode and said mix, said sheet being moistened with liquid electrolyte, and a thin adhering skin of liquid impervious material enclosing said mix and said electrodes, said skin being of laminated construction including a coating of quick drying varnish adjacent said mix and said electrodes, a coating of rubber compound over said varnish coating, a further coating of varnish over said rubber coating and a further coating of rubber compound.

7. A battery assembly including a plurality of cells each including a depolarizer mix, a carbon electrode in contact with one side of said mix, an electrolyte and a zinc electrode at the other side of said mix, a thin adhering skin of liquid-impervious material enclosing said mix and said electrodes, said skin being of substantially uniform thickness over the entire assembly of elements and having an external shape conforming to the external shape of the assembly and being of laminated construction including a thin coating of quick drying varnish adjacent said mix and said electrodes and a further coating of substantially uniform thickness extending entirely over said varnish coating, said further coating being of elastic rubber compound permitting expansion of the battery and adhering firmly to said varnish coating, terminals for said cells, resilient conductors connecting said terminals to the electrodes of said cells, a casing in which said coated assembly loosely is mounted permitting expansion of the battery, loose packing between said assembly and said casing, and a top layer of sealing material in which said terminals are embedded.

8. A battery assembly including a plurality of cells each including a depolarizer mix, a carbon electrode in contact with one side of said mix, an electrolyte and a zinc electrode at the other side of said mix, a binding of flexible material around said electrodes and mix, a thin adhering skin of liquid-impervious material enclosing said mix and said electrodes and anchoring said binding in position, said skin being of laminated construction including a skin-like coating of quick drying varnish adjacent said mix and said electrodes and a further coating of substantially uniform thickness extending entirely over said varnish coating, said further coating being of elastic material permitting expansion of the battery, said completed laminated skin conforming closely to the shape of the individual cells and having an external shape conforming to the external shape of the assembly of cells, the individual coatings constituting said skin adhering firmly to one another, terminals for said cells, resilient conductors connecting said terminals to the electrodes of said cells, a casing in which said coated assembly is loosely mounted permitting expansion of the battery, loose packing between said assembly and said casing and a top layer of sealing material in which said terminals are embedded.

9. A battery assembly including a plurality of cells each including a depolarizer mix, a carbon electrode in contact with one side of said mix, an electrolyte and a zinc electrode at the other side of said mix, a binding of rubber tape applied under tension around said electrodes and mix, a thin adhering skin of liquid-impervious material enclosing said mix and said electrodes and anchoring said elastic binding in position, said skin being of laminated construction including a coating of quick drying varnish adjacent said mix and said electrodes, a coating of rubber compound over said varnish coating, a further coating of varnish over said rubber coating, a further coating of rubber compound, a final coating of varnish to give a dry handleable surface, terminals for said cells, resilient conductors connecting said terminals to the electrodes of said cells, a casing in which said coated assembly is mounted, loose packing between said assembly and said casing and a top layer of sealing material in which said terminals are embedded.

10. A battery assembly including a plurality of cells each including a depolarizer mix, a carbon electrode in contact with one side of said mix, an electrolyte and a zinc electrode at the other side of said mix, flexible binding around said electrodes and mix, a thin adhering skin of liquid-impervious material enclosing said mix and said electrodes and anchoring said flexible binding in position, said skin being of laminated construction including a thin but mechanically strong coating of quick drying varnish adjacent said mix and said electrodes and a further coating of substantially uniform thickness extending entirely over said varnish coating, said further coating being of elastic rubber compound permitting expansion of the battery, said completed laminated skin conforming closely to the shape of the individual cells and having an external shape conforming to the external shape of the assembly of cells, the individual coatings constituting said skin adhering firmly to one another, terminals for said cells, resilient conductors connecting said terminals to the electrodes of said cells, a casing in which said coated assembly is loosely mounted permitting expansion of the battery, granular packing disposed loosely between said assembly and said casing, a layer of said packing above said assembly and a top layer of sealing material in which said terminals are embedded.

11. A battery assembly including a plurality of cells each including a depolarizer mix, a carbon electrode in contact with one side of said mix, an electrolyte and a zinc electrode at the other side of said mix, a binding of rubber tape applied under tension around said electrodes and mix, a thin adhering skin of liquid impervious material enclosing said mix and said electrodes and anchoring said elastic binding in position, said skin being of laminated construction including a coating of quick drying varnish adjacent said mix and said electrodes, a coating of rubber compound over said varnish coating, a further coating of varnish over said rubber coating, a further coating of rubber compound, terminals for said cells, resilient conductors connecting said terminals to the electrodes of said cells, a casing in which said coated assembly is mounted, granular packing disposed loosely between said assembly and said casing, a layer of said packing above said assembly and a top layer of sealing material in which said terminals are embedded.

12. A battery assembly including a plurality of cells each including a depolarizer mix, a carbon electrode in contact with one side of said mix, a zinc electrode at the other side of said mix, a sheet of porous paper between said zinc electrode and said mix, said sheet being moistened with liquid electrolyte, a binding of rubber tape applied under tension around said electrodes and mix in two directions at right angles to one another, a thin adhering skin of liquid impervious material enclosing said mix and said electrodes and anchoring said elastic binding in position, said skin being of laminated construction including a coating of quick drying varnish adjacent said mix and said electrodes, a coating of rubber compound over said varnish coating, a further coating of varnish over said rubber coating, a further coating of rubber compound, a final coating of varnish, terminals for said cells, resilient conductors connecting said terminals to the electrodes of said cells, a casing in which said coated assembly is mounted, packing disposed loosely between said assembly and said casing, a layer of said packing above said assembly and a top layer of sealing material in which said terminals are embedded.

13. In a flat type dry cell battery a depolarizer mix, a carbon electrode in contact with one side of said mix, an electrolyte and a zinc electrode at the other side of said mix, and a thin adhering skin of liquid impervious material completely enclosing said mix and said electrodes and permitting expansion of said battery, said skin being of substantially uniform thickness over the entire assembly of elements and having an external shape conforming to the external shape of the assembly and including a thin inner coating which adheres to the battery and retains the battery elements in their correct positions relatively to one another, but is capable of splitting locally to permit the outward passage of gas from the battery, a further coating of rubber or rubber compound which adheres to said inner coating and is capable of expanding locally to retain any gases which penetrate said inner coating.

14. In a flat type dry cell battery a flat tablet of depolarizer mix, a carbon electrode in contact with one side of said mix, an electrolyte and a zinc electrode at the other side of said mix, said carbon electrode and said zinc electrode each being of area greater than that of the flat sides of the mix tablet so that edge portions of said electrodes project beyond the edges of said mix tablet, and a thin adhering skin of liquid impervious material completely enclosing said mix and said electrodes and permitting expansion of said battery, said skin including a thin inner coating which adheres to the projecting edge portions of the electrodes and forms a relatively rigid and inelastic enclosure for said battery capable of being burst locally by gases emanating from the battery and a further coating of rubber or rubber compound which adheres to said inner coating and is capable of expanding locally to retain any gases which penetrate said inner coating.

15. A battery assembly including a flat tablet of depolarizer mix, a flat carbon electrode in contact with one side of said mix, an electrolyte and a flat zinc electrode at the other side of said mix, said carbon electrode and said zinc electrode each being of area greater than that of the flat sides of the mix tablet so that edge portions of said electrodes project beyond the edges of said mix tablet, a plurality of thin coatings applied one upon the other over said assembly, at least one of said coatings being of elastic material, said coatings adhering firmly one to another to form a thin laminated liquid-impervious skin completely enclosing and hermetically sealing said assembly and adhering to the said edge portions of said electrodes and the edge portions of said tablet and said skin being of substantially uniform thickness over the entire assembly and having an external shape conforming to the external shape of the assembly.

16. A battery assembly including a plurality of cells each including a flat tablet of depolarizer mix, a flat carbon electrode in contact with one side of said mix, an electrolyte and a flat zinc electrode at the other side of said mix, said carbon electrode and said zinc electrode each being of area greater than that of the flat sides of the mix tablet so that edge portions of said electrodes project beyond the edges of said mix tablet, a plurality of thin coatings applied one upon the other over said assembly, at least one of said coatings being of elastic material and at least one further coating being of quick-drying varnish, said coatings adhering firmly one to another to form a thin laminated liquid-impervious skin completely enclosing and hermetically sealing said assembly and adhering to the said edge portions of said electrodes to seal said cells one from another, said skin being of substantially uniform thickness over the entire assembly and having an external shape conforming to the external shape of the assembly.

17. A battery assembly including a plurality of cells each including a flat tablet of depolarizer mix, a flat carbon electrode in contact with one side of said mix, an electrolyte and a flat zinc electrode at the other side of said mix, said carbon electrode and said zinc electrode each being of area greater than that of the flat sides of the mix tablet so that edge portions of said electrodes project beyond the edges of said mix tablet, a plurality of thin coatings applied one upon the other over said assembly including a plurality of separate thin coatings of elastic material and a plurality of separate thin coatings of quick-drying varnish, said coatings adhering firmly one to another to form a thin laminated liquid-impervious skin completely enclosing and hermetically sealing said assembly and adhering to the said edge portions of said electrodes to seal said cells one from another, said skin being of substantially uniform thickness over the entire assembly and having an external shape conforming to the external shape of the assembly.

FRANK MacCALLUM.